(12) United States Patent
Gibson et al.

(10) Patent No.: US 9,222,453 B2
(45) Date of Patent: Dec. 29, 2015

(54) METHOD FOR RESTARTING AN ENGINE

(75) Inventors: Alex O'Connor Gibson, Ann Arbor, MI (US); De-Shiou Chen, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 903 days.

(21) Appl. No.: 13/367,074

(22) Filed: Feb. 6, 2012

(65) Prior Publication Data

US 2013/0199496 A1  Aug. 8, 2013

(51) Int. Cl.
| F02N 11/08 | (2006.01) |
| F02D 41/00 | (2006.01) |
| F02D 41/12 | (2006.01) |
| F02D 41/04 | (2006.01) |
| F02D 41/06 | (2006.01) |
| F02P 11/02 | (2006.01) |
| F02D 17/04 | (2006.01) |

(52) U.S. Cl.
CPC ........ *F02N 11/0844* (2013.01); *F02D 41/0002* (2013.01); *F02D 41/042* (2013.01); *F02D 41/065* (2013.01); *F02D 41/126* (2013.01); *F02N 11/0814* (2013.01); *F02P 11/025* (2013.01); *F02D 17/04* (2013.01); *F02D 2041/0092* (2013.01); *F02N 11/0818* (2013.01); *F02N 11/0822* (2013.01); *Y02T 10/42* (2013.01); *Y02T 10/48* (2013.01)

(58) Field of Classification Search
CPC ............... F02B 29/083; F02D 41/123–41/126; F02D 41/042; F02D 41/062; F02D 41/0002; F02D 41/0005; F02N 11/08; F02N 11/0844; F02N 11/0825; F02N 11/0814; F02N 11/0818; F02N 11/822; F02N 19/004; F01M 1/10; B60W 10/06; B60W 30/18018; B60W 30/181; B60W 30/18136; B60W 30/1884; Y02T 10/42; Y02T 10/48

USPC .................. 701/101, 102, 103, 112, 113, 54; 123/179.3, 179.4, 179.5, 179.16, 403, 123/491, 182.1
See application file for complete search history.

(56) References Cited

U.S. PATENT DOCUMENTS

| 4,364,343 | A | * | 12/1982 | Malik | F02D 41/042 123/179.16 |
| 4,452,203 | A | * | 6/1984 | Oshika | F02D 9/02 123/376 |
| 6,802,291 | B2 | | 10/2004 | Ujifusa | |
| 6,823,827 | B2 | * | 11/2004 | Sugiura | F02D 11/105 123/179.4 |
| 6,839,621 | B2 | * | 1/2005 | Kaneko | F02D 17/04 123/179.4 |
| 6,886,519 | B2 | * | 5/2005 | Slopsema | F02D 41/0005 123/192.1 |

(Continued)

FOREIGN PATENT DOCUMENTS

| EP | 1582737 | A2 | 3/2005 | |
| JP | 2005155362 | A | * | 6/2005 | ............. Y02T 10/48 |

(Continued)

*Primary Examiner* — Stephen K Cronin
*Assistant Examiner* — Brian Kirby
(74) *Attorney, Agent, or Firm* — Julia Voutyras; Alleman Hall McCoy Russell & Tuttle LLP

(57) ABSTRACT

Methods and systems for controlling an engine that may be automatically stopped and started are presented. In one example, a method adjusts a position of an air inlet throttle according to engine position and in response to an operator change of mind to restart an engine that is being automatically stopped.

20 Claims, 5 Drawing Sheets

(56) References Cited

U.S. PATENT DOCUMENTS

| | | | | |
|---|---|---|---|---|
| 6,910,457 B2* | 6/2005 | Grieser | F02D 9/02 | 123/198 DB |
| 7,051,693 B2* | 5/2006 | Tetsuno | F02D 41/042 | 123/179.5 |
| 7,066,128 B2* | 6/2006 | Satake | F02N 99/008 | 123/179.4 |
| 7,079,941 B2* | 7/2006 | Tetsuno | F02N 11/0814 | 123/179.5 |
| 7,258,099 B2* | 8/2007 | Yoshida | F02D 41/065 | 123/182.1 |
| 7,269,499 B2* | 9/2007 | Murakami | F02D 41/042 | 701/112 |
| 7,308,962 B2* | 12/2007 | Sen | B60K 31/04 | 180/167 |
| 7,349,791 B2* | 3/2008 | Nishikiori | F02D 13/0261 | 123/568.14 |
| 7,503,308 B2* | 3/2009 | Kitagawa | F02D 37/02 | 123/325 |
| 7,527,027 B2* | 5/2009 | Fuwa | F02D 11/107 | 123/391 |
| 7,559,304 B2* | 7/2009 | Kataoka | F02D 41/0002 | 123/179.18 |
| 7,706,961 B2* | 4/2010 | Tetsuno | F02D 35/026 | 123/179.16 |
| 7,865,292 B2* | 1/2011 | Sato | F02D 41/0007 | 123/559.1 |
| 7,890,243 B2* | 2/2011 | Abendroth | F02N 11/0818 | 123/179.3 |
| 7,935,021 B2* | 5/2011 | Tabata | B60K 6/445 | 477/107 |
| 8,036,817 B2* | 10/2011 | Ota et al. | | 701/113 |
| 8,265,860 B2* | 9/2012 | Ichinose et al. | | 701/113 |
| 8,412,443 B2* | 4/2013 | Gibson | | 701/112 |
| 2003/0041831 A1* | 3/2003 | Aoki | B60K 6/485 | 123/179.4 |
| 2004/0149251 A1* | 8/2004 | Nishikawa | F02D 41/042 | 123/198 DB |
| 2008/0041339 A1* | 2/2008 | Nishikiori | F02D 13/0261 | 123/406.48 |
| 2008/0189007 A1* | 8/2008 | Takamiya | F01L 1/34 | 701/30.8 |
| 2009/0084351 A1* | 4/2009 | Asano | F02D 13/023 | 123/339.14 |
| 2009/0088958 A1* | 4/2009 | Ota | F02B 23/104 | 701/113 |
| 2010/0114461 A1* | 5/2010 | Gibson | F02D 41/0002 | 701/112 |
| 2010/0114462 A1* | 5/2010 | Gibson | F02D 41/0002 | 701/113 |
| 2010/0305820 A1* | 12/2010 | McGee | B60W 10/06 | 701/54 |
| 2011/0174255 A1* | 7/2011 | Neuburger | B60L 3/0046 | 123/179.4 |
| 2011/0197836 A1* | 8/2011 | Murata | F02D 9/02 | 123/90.15 |
| 2011/0239974 A1* | 10/2011 | Shoda | F02D 41/0002 | 123/179.4 |
| 2011/0246046 A1* | 10/2011 | Ichinose | F02D 17/04 | 701/103 |

FOREIGN PATENT DOCUMENTS

| | | | | |
|---|---|---|---|---|
| JP | 2005248967 A | * | 9/2005 | F02N 11/0844 |
| JP | 2008180095 A | * | 8/2008 | |
| JP | WO2009139040 A1 | * | 11/2009 | F02D 17/04 |
| JP | 2010248998 A | * | 11/2010 | |
| WO | WO 2009007819 A2 | * | 1/2009 | F02B 29/02 |
| WO | WO 2010119898 A1 | * | 10/2010 | B60W 10/06 |

* cited by examiner

METHOD FOR RESTARTING AN ENGINE

FIELD

The present description relates to methods and systems for controlling an engine that may be automatically stopped and started. The methods and systems may be particularly useful during conditions where it may be desirable to restart an engine that is decelerating due to an engine stop request.

BACKGROUND AND SUMMARY

An engine may be automatically stopped during selected operating conditions to conserve fuel. Stopping the engine ceases fuel flow to the engine, thereby reducing fuel consumption and engine emissions. For example, the engine may be automatically stopped when a requested engine torque is less than a threshold level, a brake pedal is depressed, and while vehicle speed is zero. Further, the engine may be automatically stopped even though there is no direct operator request to stop the engine via a dedicated engine stop or start input (e.g., an input that has a sole purpose of starting and/or stopping the engine). The engine may be automatically stopped via stopping fuel flow and/or spark to the engine. Further, the engine air inlet throttle may also be closed in response to an engine stop request so as to reduce engine noise and vibration.

The engine stopping process may occur over several seconds when cylinders that have received fuel prior to an engine stop request are allowed to combust the fuel before the engine stops. Additionally, it can take two or more revolutions of the engine for the engine to run down and reach zero speed after fuel and/or spark delivery to engine cylinders is ceased. During the engine run down (e.g., the period where engine speed decreases in the absence of combustion after an engine stop request), it is possible for operating conditions to change such that it is no longer desirable to stop the engine. For example, a driver may release a brake pedal after the engine stop request is issued, thereby indicating the driver's desire or intent to proceed to accelerate the vehicle. Fuel and spark delivery to the engine may be resumed upon the change in operating conditions. However, it may be difficult to restart the engine if engine speed decreases too rapidly during the engine restart process. Further, the engine may have to be restarted via a starter motor if engine speed decreases at a higher rate than is desired.

The inventors herein have recognized the above-mentioned disadvantages and have developed a method for operating an engine, comprising: adjusting an actuator a first time to automatically stop an engine; adjusting the actuator a second time before the engine reaches zero speed in response to a request to restart the engine; and adjusting an air inlet throttle position in response to a state of an intake valve and the request to restart the engine.

By adjusting a position of an air inlet throttle in response to a state of an intake valve and a request to restart an engine, it may be possible to restart the engine without causing the engine to decelerate more than is desired. For example, after combustion in a cylinder has been stopped in response to an engine stop request, it may be possible to select a cylinder in which combustion is to be reinitiated. The air inlet throttle may be opened at a time after an intake valve of a cylinder preceding the selected cylinder in order of combustion closes. In this way, an amount of air entering the preceding cylinder may be maintained at a low level so that compression torque of the preceding cylinder is low and does not cause the engine to decelerate more than is desired.

The present description may provide several advantages. Specifically, the approach may allow a driver to launch a vehicle sooner. Additionally, the approach may reduce engine fuel consumption and emissions since less fuel may be injected to restart the engine. Further, the approach may reduce engine noise and vibration since the approach increases cylinder air amount in cylinders where combustion takes place and not in cylinders where combustion is inhibited.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example, referred to herein as the Detailed Description, when taken alone or with reference to the drawings, where.

DETAILED DESCRIPTION

Figure 1:
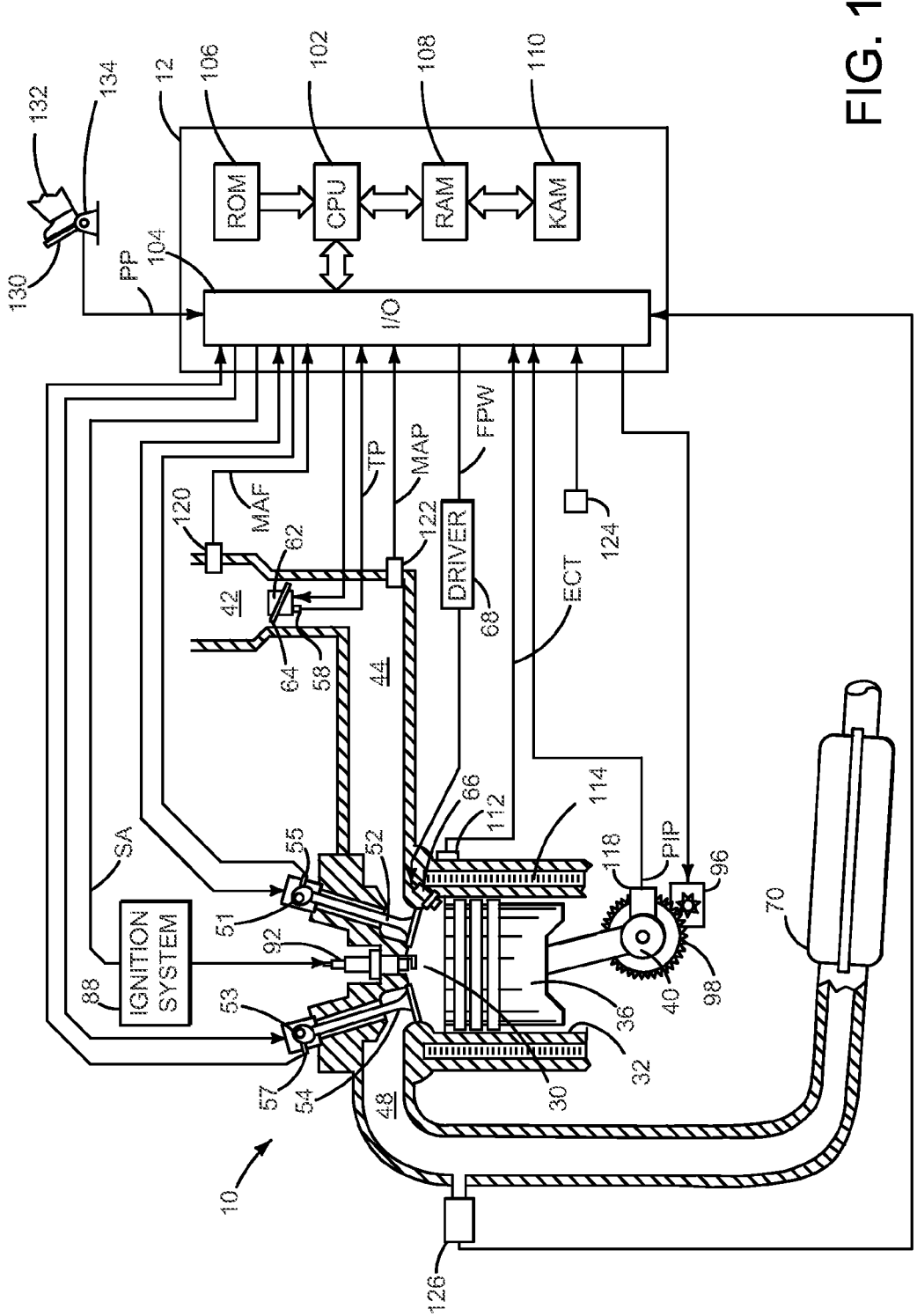
FIG. 1 is a schematic diagram of an engine.
Figure 2:
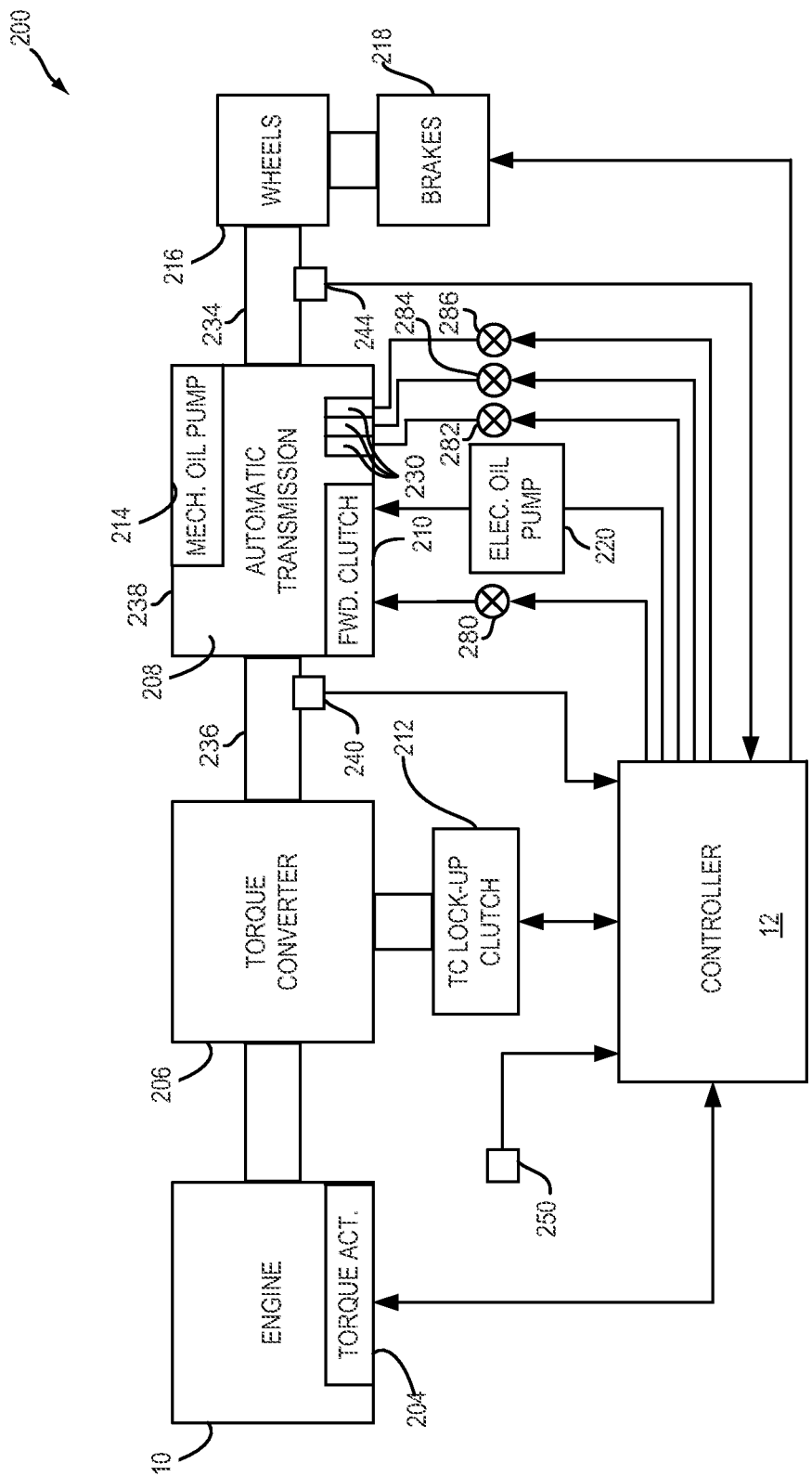
FIG. 2 is shows an example powertrain system layout.

The present description is related to controlling an engine that may be automatically stopped and started. In one non-limiting example, the engine may be configured as illustrated in FIG. 1. Further, the engine may be part of a vehicle powertrain as illustrated in FIG. 2.

Figure 3:
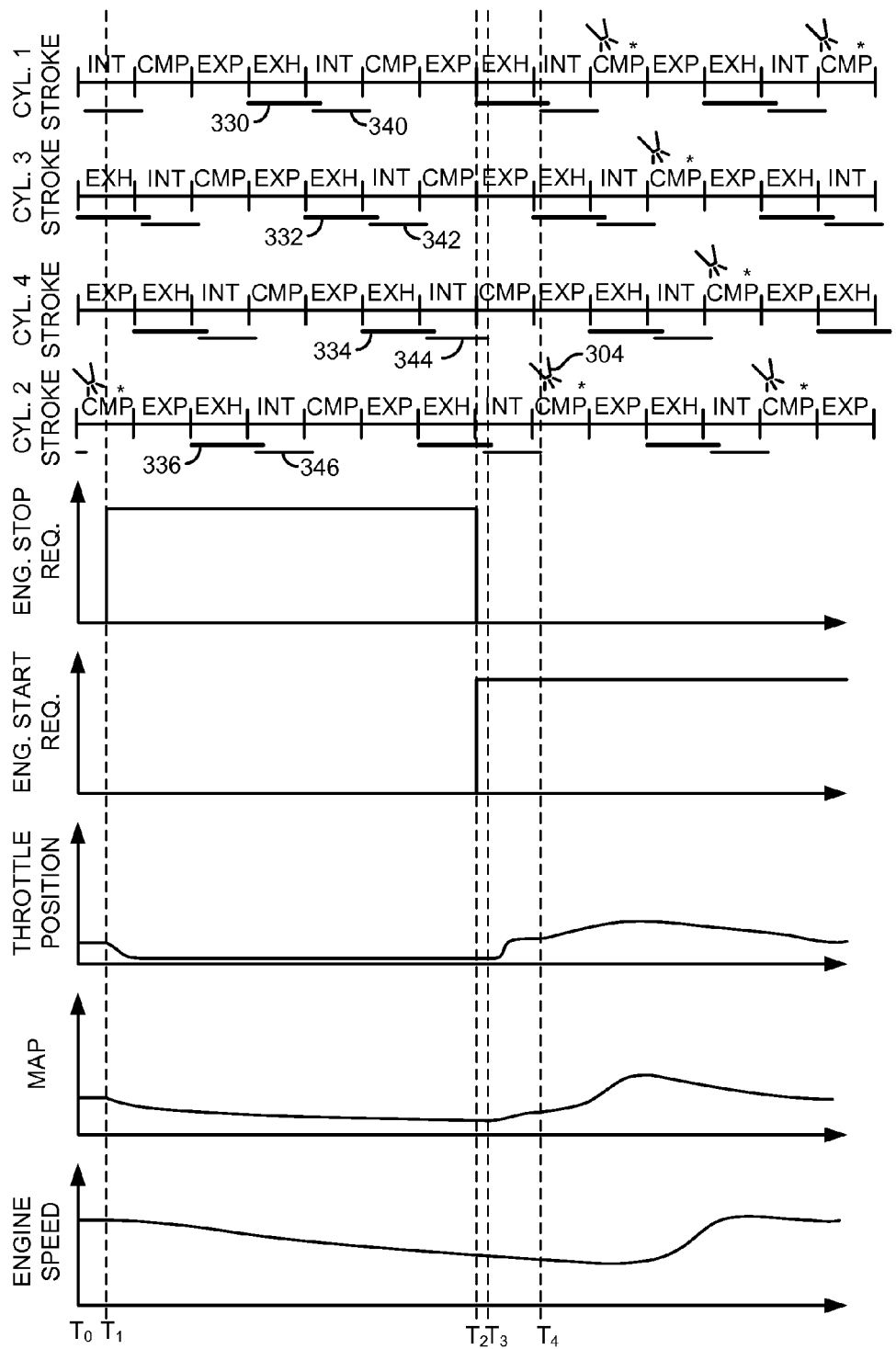
FIGS. 3-4 are example plots of signals of interest during simulated engine starts.
Figure 4:
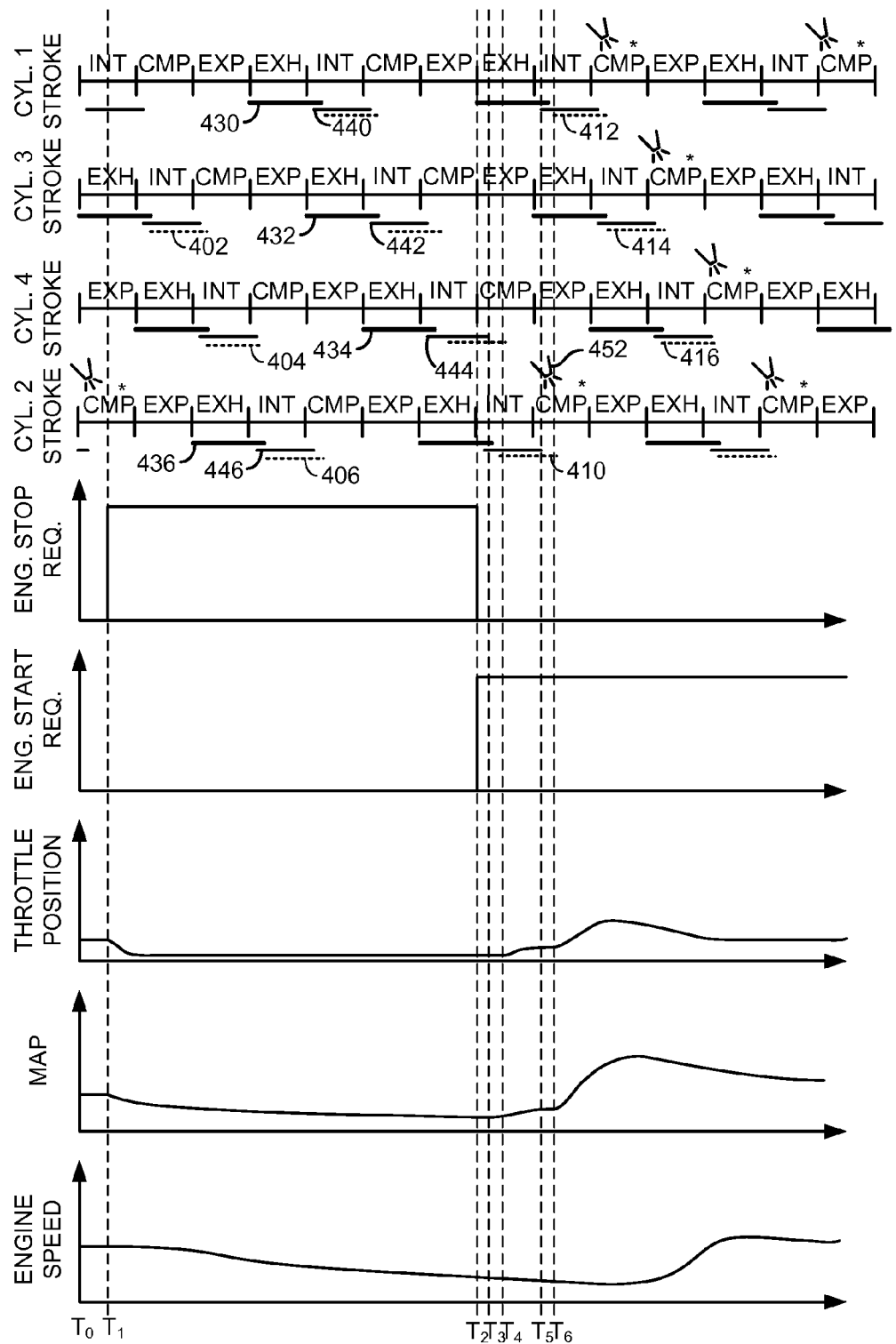
Figure 5:
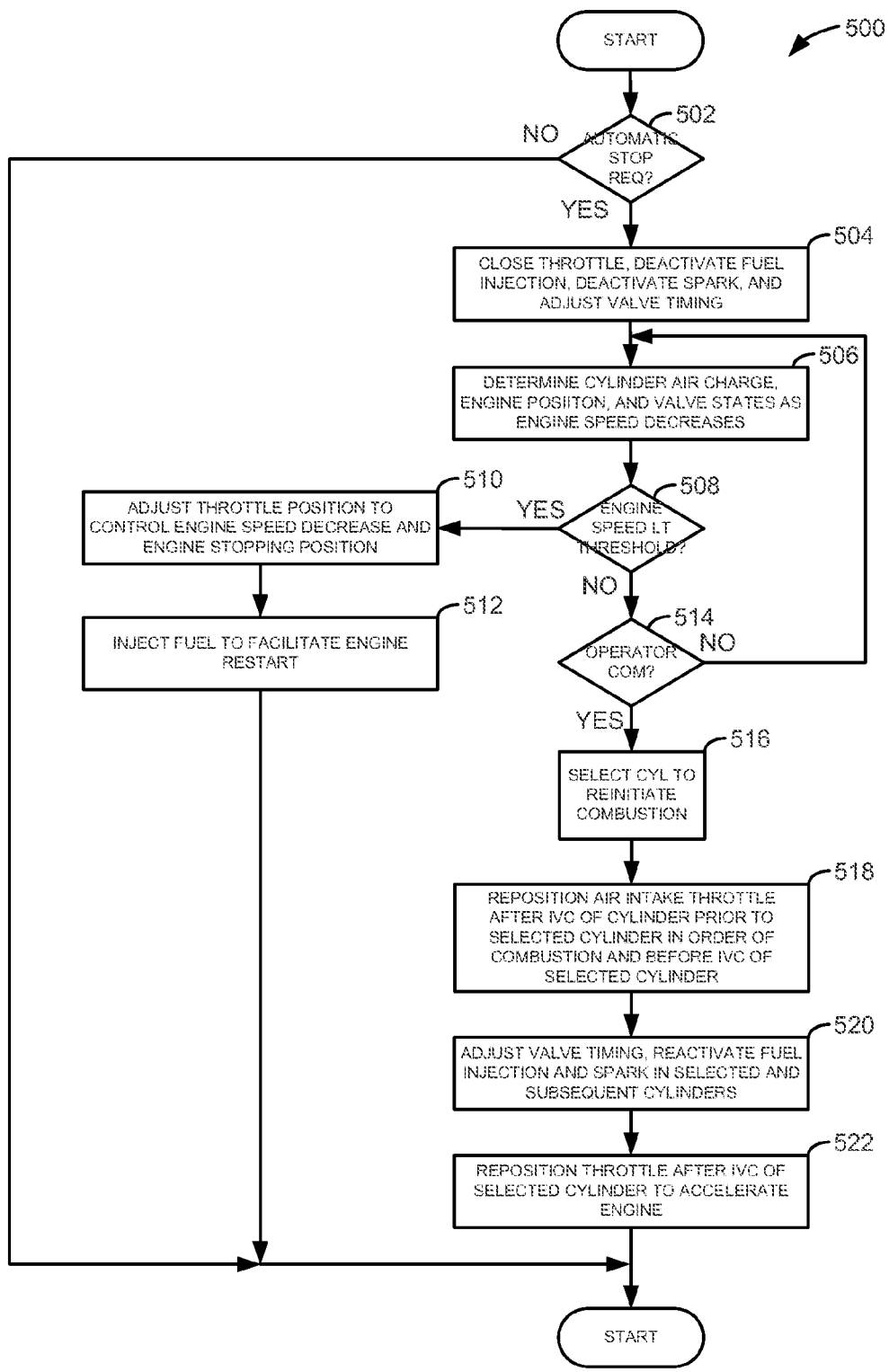
FIG. 5 is a flowchart of an example engine starting method.

Engine stopping and starting may be performed according to the method described by FIG. 5. The method of FIG. 5 may be used to control an engine as shown in FIGS. 3 and 4. The method of FIG. 5 restarts an engine without aid of a starter or motor when operating conditions change while an engine is in the process of stopping before engine speed reaches zero.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic air inlet throttle 62 which adjusts a position of air inlet throttle plate 64 to control air flow from air intake 42 to intake manifold 44. In one example, a high pressure, dual stage, fuel system may be used to generate higher fuel pressures.

Ignition coil 88 provides an ignition spark to combustion chamber 30 via spark plug 92 in response to a signal from controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine starter 96 may selectively engage flywheel 98 which is coupled to crankshaft 40 to rotate crankshaft 40. Engine starter 96 may be engaged via a signal from controller 12. In some examples, engine starter 96 may be engaged without input from a driver dedicated engine stop/start command input (e.g., a key switch or pushbutton). Rather, engine starter 96 may be engaged when a driver releases a brake pedal or depresses accelerator pedal 130 (e.g., an input device that does not have a sole purpose of stopping and/or starting the engine). In this way, engine 10 may be automatically started via engine starter 96 to conserve fuel.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; barometric pressure from sensor 124; and a measurement of air inlet throttle position from sensor 58. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle drive-train 200. Drive-train 200 may be powered by engine 10. Engine 10 may be started with an engine starting system (not shown). Further, engine 10 may generate or adjust torque via torque actuator 204, such as a fuel injector, air inlet throttle, etc.

An engine output torque may be transmitted to torque converter 206 to drive an automatic transmission 208 via transmission input shaft 236. Further, one or more clutches may be engaged, including forward clutch 210 and gear clutches 230, to propel a vehicle. In one example, the torque converter may be referred to as a component of the transmission. Further, transmission 208 may include a plurality of gear clutches 230 that may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft 236 of transmission 208. Alternatively, the torque converter lock-up clutch 212 may be partially engaged, thereby enabling the amount of torque relayed to the transmission to be adjusted. A controller 12 may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 to propel the vehicle via transmission output shaft 234. Specifically, automatic transmission 208 may transfer an input driving torque at the input shaft 236 responsive to a vehicle traveling condition before transmitting an output driving torque to the wheels.

Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

A mechanical oil pump 214 may be in fluid communication with automatic transmission 208 to provide hydraulic pressure to engage various clutches, such as forward clutch 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214. Electric oil pump 220 may be driven by an electric motor (not shown) to which an electric power may be supplied, for example by a battery (not shown).

Transmission input speed may be monitored via transmission input shaft speed sensor 240. Transmission output speed may be monitored via transmission output shaft speed sensor 244. In some examples, accelerometer 250 may provide vehicle acceleration data to controller 12 so that clutches 210 and 230 may be controlled via valves 280-286 during engine starting and vehicle launch.

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling air inlet throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 12 may initiate engine shutdown by shutting off fuel and spark to the engine. Further, to maintain an amount of torsion in the transmission, the controller may ground rotating elements of transmission 208 to a case of the transmission 238 and thereby to the frame of the vehicle. The controller may engage one or more transmission clutches, such as forward clutch 210, and lock the engaged transmission clutch(es) to the transmission case and vehicle frame via electrically actuated valves 280-286. Valves 280-286 may be pulse width modulated control valves that control pressure of oil flowing to clutch 210 and gear clutches 230. In one example, during the engine shutdown, hydraulic pressure for clutch modulation may be provided by enabling the electric oil pump 220, if sufficient hydraulic pressure cannot be provided by the mechanical oil pump 214.

A wheel brake pressure may also be adjusted during the engine shutdown, based on the clutch pressure, to assist in tying up the transmission while reducing a torque transferred through the wheels. Specifically, by applying the wheel brakes while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When engine restart conditions are satisfied, and/or a vehicle operator wants to launch the vehicle, controller 12 may reactivate the engine by resuming cylinder combustion. To launch the vehicle, transmission 208 may be unlocked and the wheel brakes 218 may be released, to return torque to the driving wheels 216. A clutch pressure may be adjusted to unlock the transmission via valves 280-286, while a wheel brake pressure may be adjusted to coordinate the release of the brakes with the unlocking of the transmission, and a launch of the vehicle.

Thus, the systems of FIGS. 1 and 2 provide for a system for controlling an engine, comprising: an engine including an adjustable valve timing mechanism and an air inlet throttle; and a controller including executable instructions stored in a non-transitory medium to automatically cease combustion in a cylinder of the engine and adjust valve timing of the cylinder in response to operating conditions other than an operator engine stop request, the controller including additional instructions to reinitiate combustion in the cylinder and adjust valve timing of the cylinder in response to operating conditions, the controller including additional instructions to adjust a position of an air inlet throttle in response to valve closing timing adjustments provided by the adjustable valve timing mechanism. In this way, cylinder air charge can be controlled to improve engine restarting.

Additionally, the system includes where the controller includes further instructions to adjust the position of the air inlet throttle in response to barometric pressure. The system also includes where the controller includes further instructions to adjust the position of the air inlet throttle in response to engine speed. The system also includes where the controller includes further instructions to adjust the position of the air inlet throttle in response to intake manifold pressure. In some examples, the system includes where the controller includes further instructions to reactivate combustion in the cylinder after adjusting the position of the air inlet throttle.

Referring now to FIG. 3, an example plot of simulated signals of interest during an automatically initiated engine stop and restart are shown. The sequence of FIG. 3 may be provided via executing the method of FIG. 5 in the system described in FIGS. 1 and 2. The sequence begins at the left hand side of FIG. 3 and moves to the right hand side of FIG. 3. Vertical markers $T_0$-$T_4$ identify times of particular interest during the sequence.

The first plot from the top of FIG. 3 represents the stroke that cylinder number one of a four cylinder, four stroke, engine is on during the sequence. The intake stroke of cylinder number one is abbreviated as INT and compression stroke is abbreviated as CMP. Further, the expansion or power stroke is abbreviated as EXP and the exhaust stroke is abbreviated as EXH. The heavy horizontal lines, such as 330, represent exhaust valve opening timing of cylinder number one exhaust valves. The lighter horizontal lines, such as 340, represent intake valve opening timing of cylinder number one intake valves. Intake and exhaust valve opening times for cylinders 2-4 are similarly shown at 332-336 and 342-346. The location of injector nozzle 304 indicates injection timing during the cycle of cylinder number one. Similar injector nozzles represent injection timing for each of the respective engine cylinders. The injection timings shown in FIGS. 3 and 4 are representative for a direct injection engine. Alternative injection times may be provided for a port fuel injected engine (e.g., while the intake valve is closed or while the intake valve is open for a portion of the ejection period). The * represent spark or ignition timing in each the respective engine cylinders. The second, third, and fourth plots from the top of FIG. 3 represent cylinder strokes for the remaining three cylinders of the engine.

It should be noted that there are 180 crankshaft degrees between cylinder strokes and since the X axis is based on cylinder stroke rather than time, the amount of time between engine strokes may vary depending on engine speed.

The fifth plot from the top of FIG. 3 represents an automatic engine stop request versus time. The time scale is not linear but is aligned with the cylinder strokes identified in plots one through four. For example, the events that occur at the vertical marker at time $T_1$ in the fifth plot occur at the same time as events that occur at time $T_1$ in the remaining plots. The Y axis of the fifth plot represents an engine stop request. When the engine stop request signal is at a higher level, an engine stop request is present. When the engine stop request is at a lower level, an engine stop request is not present.

The sixth plot from the top of FIG. 3 represents an automatic engine start request versus time. Again, the time scale is not linear but is aligned with the cylinder strokes identified in plots one through four. When the engine start request signal is at a higher level, an engine start request is present. When the engine start request is at a lower level, an engine start request is not present.

The seventh plot from the top of FIG. 3 represents engine air inlet throttle versus time. Again, the time scale is not linear but is aligned with the cylinder strokes identified in plots one through four. The opening amount of the air inlet throttle increases in a direction of the Y axis arrow. The air inlet throttle is substantially closed when the air inlet throttle position is shown near the X axis.

The eighth plot from the top of FIG. 3 represents engine intake manifold pressure (MAP) versus time. Again, the time scale is not linear but is aligned with the cylinder strokes identified in plots one through four. MAP increases in a direction of the Y axis arrow.

The ninth plot from the top of FIG. 3 represents engine speed versus time. Again, the time scale is not linear but is aligned with the cylinder strokes identified in plots one through four. Engine speed increases in a direction of the Y axis arrow. The engine is at zero speed at the X axis.

At time $T_0$, the engine is operating at higher speed. Cylinder number one is on an intake stroke, cylinder number three is on an exhaust stroke, cylinder number four is on an expansion stroke, and cylinder number two is on a compression stroke. Fuel is being injected to cylinder number two. Further, the engine stop request is not asserted, nor is the engine start request. The air inlet throttle is partially open and manifold pressure is at a middle level.

At time $T_1$, about half way through the intake stroke of cylinder number one, the engine stop request is asserted. In one example, the engine stop request is automatically asserted without a driver or operator manipulating a dedicated input that has a sole function of starting and/or stopping the engine. For example, an engine controller may activate the engine stop request when vehicle speed is zero, the engine torque demand is less than a threshold, and when a vehicle brake is activated. The engine speed, MAP, air inlet throttle position, and engine start request have not changed from time $T_0$ to time $T_1$.

Between time $T_1$ and time $T_2$, and particularly in response to the engine stop request at time $T_1$, fuel injection to engine cylinders ceases. Spark continues until the last injected fuel is combusted in cylinder number two. Thus, combustion in the engine ceases and then engine speed begins to decrease. The engine valves continue to operate as before the engine stop request.

At time $T_2$, the engine start request is asserted and the engine stop request is withdrawn. In this way, an engine restart is requested. The engine restart may be automatically generated via an engine controller. For example, the automatic engine start request may be initiated when a driver lifts a foot from a brake pedal or when another vehicle operating condition changes state during the engine stopping process. Further, the engine restart request may be asserted without a driver or operator providing input to a dedicated input that has a sole function of stopping and/or stopping the engine (e.g., an on/off switch).

The engine start request is asserted at a time just before intake valve closing (IVC) of cylinder number four and just before intake valve opening (IVO) of cylinder number two. In this example, it is judged too late to inject fuel and combust the injected fuel in cylinder number four. Therefore, cylinder number two is selected as a first cylinder to receive fuel via injection in response to the engine start request. The air inlet throttle remains in a substantially closed position and the engine continues to rotate through the respective cylinder strokes.

At time $T_3$, the engine has rotated to a position where the state of cylinder number four intake valve changes from open to closed. The air inlet throttle position may be adjusted from the substantially closed position to a partially open position after the intake valve of cylinder number four closes. The air inlet throttle is partially opened to increase the amount of air entering cylinder number four. The air inlet throttle is closed until after the intake valve of cylinder number four closes so that compression torque in cylinder number four does not slow the engine more than is desired. In this way, the air inlet throttle is adjusted in response to the operating states of engine valves. Further, in some examples, the air inlet throttle is adjusted in response to IVC of a particular cylinder (e.g., cylinder number four in this example). Thus, the cylinder air charge (e.g., an amount of air inducted into a cylinder during a cylinder cycle) of a cylinder preceding a cylinder selected for a first combustion event after a request to start the engine is maintained at a low level to reduce engine deceleration, and the cylinder air charge of the cylinder selected for a first combustion event after an engine start request is increased to provide torque to accelerate the engine.

In one example, the air inlet throttle is adjusted to a position that is based on barometric pressure, intake manifold pressure, or to a predetermined position. The air inlet throttle may be adjusted to an empirically determined position that is stored in memory. If the barometric pressure is less than a nominal barometric pressure, the air inlet throttle opening amount may be increased by an amount that is stored in a table that contains empirically determined values of air inlet throttle position that are indexed in response to barometric pressure.

At time $T_4$, the intake valve of cylinder number two closes (e.g., changes state) and the air inlet throttle position is adjusted a second time and in response to the change in state or the closing of the intake valve of cylinder number two. In one example, the air inlet throttle position is adjusted to the second position in response to engine speed, air charge temperature, engine coolant temperature, barometric pressure, and intake manifold pressure. For example, after IVC of the cylinder first receiving fuel in response to a request to start the engine, the air inlet throttle may be adjusted to provide a desired intake manifold pressure. The intake manifold pressure may be monitored and the air inlet throttle opened until the desired manifold pressure is reached. The desired manifold pressure may be increased or decreased in response to barometric pressure, engine coolant temperature, and engine speed. In particular, if engine speed is relatively high, a reduced intake manifold pressure may be requested. If engine speed is relatively low, a higher intake manifold pressure may be requested. Similarly, if barometric pressure is low, the air inlet throttle opening amount may be increased so that the desired intake manifold pressure may be reached. If engine temperature is low, a higher intake manifold pressure may be requested and the air inlet throttle opening increased. The air inlet throttle position adjustments for engine coolant temperature, barometric pressure, air charge temperature, and engine speed may be empirically determined and stored in memory via tables and/or functions. The tables and/or functions may be indexed using the respective control parameters.

Fuel injection to the cylinders resumes at 304 and spark is also reactivated so as to promote combustion in the engine cylinders. The air inlet throttle position also continues to increase and then is gradually reduced so that the engine reaches idle speed. In some examples where the engine torque demand input is increased after or during the engine start request, the air inlet throttle is adjusted to provide the desired engine torque. MAP also increases as the air inlet throttle is opened. The combustion also changes the engine from decelerating to accelerating.

Referring now to FIG. 4, a second example plot of simulated signals of interest during an automatically initiated engine stop and restart are shown. Many signals of FIG. 4 are similar to those of FIG. 3. Therefore, for the sake of brevity, the description of signals in FIG. 4 is limited the differences that are not shown in FIG. 3. The sequence of FIG. 4 may be provided via executing the method of FIG. 5 in the system described in FIGS. 1 and 2.

FIG. 4 includes example base valve timings for intake and exhaust valves as well as for adjustable intake valves. The base timing of exhaust valves is indicated by the thicker lines such as 430. The base timing of intake valves is indicated by the thinner lines such as 440. The retarded timing of intake valves from based timing is indicated by dotted lines such as 402.

At time $T_0$, the engine is operating at lower speed than is shown in FIG. 3. Cylinder number one is on an intake stroke, cylinder number three is on an exhaust stroke, cylinder number four is on an expansion stroke, and cylinder number two is on a compression stroke. Fuel is being injected to cylinder number two. Further, the engine stop request is not asserted, nor is the engine start request. The air inlet throttle is partially open and manifold pressure is at a middle level.

At time $T_1$, about half way through the intake stroke of cylinder number one, the engine stop request is asserted. The engine speed, MAP, air inlet throttle position, and engine start request have not changed from time $T_0$ to time $T_1$. Between time $T_1$ and time $T_2$, fuel injection to engine cylinders ceases. Spark continues until the last injected fuel is combusted in cylinder number two. Thus, combustion in the engine ceases and then engine speed begins to decrease. The engine valves continue to operate as before the engine stop request. Further, as engine speed is decreasing, intake valve timing is retarded in response to the engine stop request. In other examples, engine intake valve timing may be advanced in response to the engine stop request. Exhaust valve opening timing during the engine stopping process is shown at 430-436. In some examples, the exhaust valve timing may also be retarded or advanced depending on engine configuration. The base intake valve opening timing is shown at 440-446. The retarded intake valve opening timing is shown at 402-406. It can be seen that intake valve retard is increased as the engine continues to rotate and as engine speed is reduced during the engine stopping process.

At time $T_2$, the engine start request is asserted and the engine stop request is withdrawn. The engine start request is asserted at a time just before intake valve closing (IVC) of cylinder number four and just before intake valve opening (IVO) of cylinder number two. In this example, like the example of FIG. 3, it is judged too late to inject fuel and combust the injected fuel in cylinder number four. Therefore, cylinder number two is selected as a first cylinder to receive fuel via injection in response to the engine start request. The air inlet throttle remains in a substantially closed position and the engine continues to rotate through the respective cylinder strokes.

Time $T_3$ represents the time of IVC if the intake valve timing had not been retarded in response to the engine stop request. However, since intake valve timing is retarded, the intake valve of cylinder number four stays open longer. Consequently, if the air inlet throttle were opened at a same time as shown in FIG. 3, the cylinder air charge of cylinder number four would increase, thereby increasing compression torque so as to further reduce engine speed. Therefore, adjusting a position of the air inlet throttle is delayed until after the intake valve of cylinder four changes state from open to closed.

At time $T_4$, the engine has rotated to a position where the state of cylinder number four intake valve changes from open to closed. The air inlet throttle position is shown being adjusted from a substantially closed position to a partially open position after the intake valve of cylinder number four closes. The air inlet throttle is partially opened to increase the amount of air entering cylinder number four. The air inlet throttle position is adjusted to a position that is less open than the amount shown in FIG. 3. The air inlet throttle is opened less so that the engine speed is not more significantly reduced by compression torque when the air inlet throttle is opened. In this way, compression torque of a cylinder may be lowered to reduce engine deceleration, yet the cylinder air charge may be sufficient to begin accelerating the engine.

The air inlet throttle is adjusted to a position between time $T_4$ and time $T_6$ that is based on barometric pressure, intake manifold pressure, or to a predetermined position. In one example, the air inlet throttle may be adjusted to an empirically determined position that is stored in memory. If the barometric pressure is less than a nominal barometric pressure, the air inlet throttle opening amount may be increased by an amount that is stored in a table that contains empirically determined values that are indexed in response to barometric pressure. Alternatively, the air inlet throttle may be opened until MAP reaches a desired pressure.

Time $T_5$, represents a time where the intake valve of cylinder number two closes when the intake valve is operated at base timing. However, in this example, intake valve timing is retarded and therefore the second air inlet throttle adjustment is delayed.

At time $T_6$, the intake valve of cylinder number two closes (e.g., changes state). The air inlet throttle position is adjusted a second time and in response to the change in state or the closing of the intake valve of cylinder number two. The air inlet throttle position may be adjusted to the second position in response to engine speed, air charge temperature, engine coolant temperature, barometric pressure, and intake manifold pressure.

Fuel injection to the cylinders resumes at 452 and spark is also reactivated so as to promote combustion in the engine cylinders. The air inlet throttle position also continues to increase. The air inlet throttle opening rate increases at a rate that is greater than is shown in FIG. 3 so that the engine can accelerate from the lower engine speed to a higher engine speed in a shorter amount of time. MAP also increases as the air inlet throttle is opened. The combustion also changes the engine from decelerating to accelerating.

Thus, the sequences of FIGS. 3 and 4 show a air inlet throttle being adjusted to control engine deceleration and combustion torque during conditions where combustion has ceased in an engine. Further, FIGS. 3 and 4 show controlling combustion torque during engine starting while the engine is decelerating and starting is desired because of a change in operating conditions, such as an operator change of mind (COM). In this way, the air inlet throttle is adjusted according to states of engine valves and intake valve closing timing.

It should be mentioned that the specific valve timings, injection timings, engine speeds, air inlet throttle adjustments, engine cylinder strokes, and MAP shown in FIGS. 3 and 4 may vary from engine type to engine type. Therefore, the timings and magnitudes of the signals are not to be interpreted as limit the scope or breadth of the description. Rather, the timings and signals are meant as non-limiting illustrations of the methods and systems described herein.

Referring now to FIG. 5, an example engine starting method is shown. The method of FIG. 5 is executable via instructions stored in non-transitory memory of the system shown in FIGS. 1 and 2. Further, the method of FIG. 5 may provide the engine operating sequences shown in FIGS. 2 and 3.

At 502, method 500 judges whether or not an automatic engine stop is requested. An automatic engine stop may be generated via a controller responding to inputs other than a dedicated operator input for stopping and/or starting the engine. If method 500 judges that an automatic engine stop is requested, method 500 proceeds to 504. Otherwise, method 500 proceeds to exit.

At 504, method 500 closes the engine air inlet throttle, deactivates fuel injection to engine cylinders, deactivates spark, and adjusts engine valve timing. The engine air inlet throttle may be closed fully or partially. The fuel injection may be deactivated upon completion of any injection events that have started before the request to stop the engine. In some examples, the air inlet throttle may be opened and closed as engine speed decreases so that engine stopping position may be controlled during conditions when an engine restart is not requested and the engine speed reaches zero. The engine valve timing may be retarded or advanced depending on the base cam timing. For example, the valve timing may be retarded in response to a request to stop the engine so as to reduce the amount of air that enters engine cylinders and compression torque during engine deceleration. Spark may be deactivated by stopping ignition coil charging. Method 500 proceeds to 506 after engine actuator adjustments are made.

At 506, method 500 determines cylinder air charge, engine position, and valve states (e.g., open or closed) as the engine rotates toward zero speed. The cylinder air charge may be estimated from MAP or an intake mass air sensor. Engine position and speed are determined via a crankshaft sensor and a camshaft sensor. The cylinder air charge, engine position, engine speed, valve closing timings, and valve states are determined even though combustion in the engine cylinders has ceased. Therefore, if there is a change in operating conditions, the engine may be restarted by reactivating combustion based on the ongoing determined cylinder air charge, engine position, engine speed, valve states, and valve closing timings. Method 500 proceeds to 508 after the engine control parameters are determined.

At 508, method 500 judges whether or not engine speed is less than a threshold speed. The threshold speed may be different for different operating conditions. In some examples, the threshold speed is a speed below which the starter is to be engaged if there is an operator change of mind to restart the engine or a change in operating conditions that make it desirable to restart the engine. If method 500 determines that engine speed is less than a predetermined threshold, method 500 proceeds to 510. Otherwise, method 500 proceeds to 514.

At 510, method 500 adjusts air inlet throttle position to control engine speed and position as engine speed approaches zero. In one example, the air inlet throttle position is adjusted in response to engine crankshaft angle and/or intake valve opening and closing times. For example, if cylinder number one is approaching IVC and engine speed is less than a predetermined speed, the air inlet throttle may be opened to increase cylinder air charge so that the engine may be stopped during the compression stroke of cylinder number one. Method 500 proceeds to 512 after engine air inlet throttle position is adjusted.

At 512, method 500 injects fuel to facilitate engine restart. In one example, fuel may be injected during the compression or expansion stroke of a cylinder as the engine approaches zero speed. The injected fuel may be combusted when an engine restart is requested. Method 500 proceeds to exit after fuel is injected to the cylinders.

At 514, method 500 judges whether or not there is an operator change of mind or a change in operating conditions that make starting combustion in the engine after an automatic engine stop request desirable. Thus, as the engine decelerates from idle speed toward zero, a request to restart the engine may be asserted. The engine restart request may be initiated in response to vehicle speed greater than zero, release of a vehicle brake, an engine torque request, or a change in battery state of charge. If an engine restart or start request is present, method 500 proceeds to 516. Otherwise, method 500 returns to 506.

At 516, method 500 selects a cylinder to reinitiate combustion as the engine decelerates toward zero speed. In one example, the engine cylinder in which combustion is reinitiated is based on the engine position when the engine start request occurs. In particular, a cylinder is selected to first receive fuel since the engine stop request when the cylinder is within a particular crankshaft angle and stroke. For example, for a direct injection engine, a first cylinder to receive fuel since the engine stop request may be a cylinder that is at an engine position of at least 120 crankshaft degrees before top-dead-center (TDC) compression stroke and in an intake or compression stroke. Thus, if a COM occurs when cylinder number one of a four stroke, four cylinder, engine is 200 degrees before TDC compression stroke and while cylinder number one is in an intake stroke, cylinder number one will receive fuel first since the engine stop request so that combustion may occur first in cylinder number one. However, if the COM occurs when cylinder number one is 90 crankshaft degrees before TDC compression stroke while cylinder number one is in a compression stroke, cylinder number three will be the first cylinder to receive fuel since the engine stop request. Cylinder number three receives fuel first since it is too late in the cylinder cycle of cylinder number one to inject a full charge of fuel. It should be noted that selection of a first cylinder to combust and crankshaft timing used to select a first cylinder to combust may vary from engine to engine.

Therefore, the timings described above are meant to describe the process of selecting a cylinder to first combust fuel after an engine stop rather than to limit the scope or breadth of the disclosure. Method 500 proceeds to 518 after a first cylinder to first receive fuel after an engine stop request while the engine is decelerating from idle speed to zero is selected.

At 518, method 500 repositions the air inlet throttle after IVC or a change in intake valve state from open to closed of a cylinder prior to the selected cylinder in an order of combustion occurs. The air inlet throttle repositioning may be delayed for a time such that the selected cylinder is within a predetermined crankshaft angle of IVC of the selected cylinder. Thus, the air inlet throttle is adjusted between IVC of a cylinder immediately preceding the selected cylinder in the engine firing order and IVC of the selected cylinder. In one example, the air inlet throttle is opened further to a predetermined position to increase cylinder air charge of the selected cylinder so that the engine may be accelerated. However, in some examples, the air inlet throttle is adjusted to at least partially close the air inlet throttle opening. The predetermined position may be empirically determined and stored in memory. In one example, the predetermined position may be stored in a table and indexed by engine speed. The predetermined position may be further adjusted to account for barometric pressure, engine coolant temperature, MAP, and air charge temperature by indexing empirically determined air inlet throttle adjustments indexed via the respective variables. Method 500 proceeds to 520 after the air inlet throttle position has been adjusted.

At 520, method 500 adjusts valve timing and reactivates fuel injection as well as spark to reinitiate combustion in engine cylinders. In one example, valve timing is advanced to increase the amount of air entering engine cylinders. Spark and fuel are reactivated in cylinders beginning with the selected cylinder and continuing with subsequent cylinders in the engine firing order. For example, where cylinder number one of a four cylinder engine is the selected cylinder, fuel may be delivered in the order of 1-3-4-2. Method 500 proceeds to 522 after fuel and spark are reactivated.

At 522, method 500 repositions the air inlet throttle a second time after IVC of the selected cylinder. In the example, the air inlet throttle is repositioned a second time after IVC of cylinder number one and before IVC of cylinder number three when the selected cylinder is cylinder number one. Thus, the air inlet throttle is adjusted between IVC of the selected cylinder and IVC of a cylinder immediately following the selected cylinder in the engine firing order.

In one example, the second position that the air inlet throttle is adjusted to is based on engine speed, engine coolant temperature, cylinder air charge temperature, barometric pressure, and intake manifold pressure. Specifically, an empirically determined base air inlet throttle adjustment is stored in a table in memory and indexed via engine speed. Further, modifiers to the base air inlet throttle are stored in memory and indexed via the respective control variables. For example, the base second air inlet throttle adjustment is retrieved from memory based on engine speed. The second air inlet throttle adjustment is modified based on barometric pressure, engine coolant, MAP, and cylinder air charge temperature by indexing tables or functions using barometric pressure, engine coolant, MAP, and cylinder air charge. Method 500 proceeds to exit after the engine throttle position is adjusted a predetermined amount of times. The engine air inlet throttle position is adjusted thereafter in response to engine torque demand.

Thus, the method of FIG. 5 provides for a method for operating an engine, comprising: adjusting an actuator a first time to automatically stop an engine; adjusting the actuator a second time before the engine reaches zero speed in response to a request to restart the engine; and adjusting an air inlet throttle position in response to a state of an intake valve and the request to restart the engine. The method includes where the actuator is a fuel injector, and where the fuel injector is held closed in response to a request to automatically stop the engine. The method also includes where the actuator is an ignition coil, and where charging of the ignition coil is inhibited in response to a request to automatically stop the engine.

In some example, the method includes where adjusting the actuator the first time deactivates the actuator, and where adjusting the actuator the second time reactivates the actuator. The method further comprises adjusting the air inlet throttle position in response to barometric pressure. The method further comprises adjusting the air inlet throttle position in response to intake manifold pressure. The method also includes where the intake valve is a cylinder intake valve, and where the engine is decelerating at a time of the request to restart the engine.

The method of FIG. 5 also provides for operating an engine, comprising: ceasing combustion in a first cylinder in response to a request to automatically stop the engine; adjusting a position of an air inlet throttle in response to a closing timing of an intake valve of a second cylinder, the second cylinder preceding the first cylinder in order of engine combustion; and reinitiating combustion in the first cylinder after adjusting the position of the air inlet throttle. In this way, the throttle may be timely adjusted so as to control compression torque and combustion torque.

The method further comprises adjusting the position of the air inlet throttle in response to a closing timing of an intake valve of the first cylinder. In another example, the method further comprises adjusting the position of the air inlet throttle in response to engine speed. The method also includes where the air inlet throttle is adjusted during or after the intake valve of the first cylinder transitions from an open state to a closed state. The method also includes where the air inlet throttle is adjusted during or after the intake valve of the second cylinder transitions from an open state to a closed state. The method includes where the position of the air inlet throttle is further adjusted in response to intake manifold pressure. The method includes where the position of the air inlet throttle is further adjusted in response to barometric pressure. The method also includes where the engine is restarted without engaging a starter.

As will be appreciated by one of ordinary skill in the art, routines described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
adjusting an actuator a first time to automatically stop an engine;
adjusting the actuator a second time before the engine reaches zero speed in response to a request to restart the engine; and
adjusting an air inlet throttle position at a time after closing an open intake valve of a cylinder having an open intake valve at a time of the request to restart the engine and before a closing of an intake valve of a cylinder next in order of engine combustion in response to the request to restart the engine.

2. The method of claim 1, where the actuator is a fuel injector, and where the fuel injector is held closed in response to a request to automatically stop the engine.

3. The method of claim 1, where the actuator is an ignition coil, and where charging of the ignition coil is inhibited in response to a request to automatically stop the engine.

4. The method of claim 1, where adjusting the actuator the first time deactivates the actuator, and where adjusting the actuator the second time reactivates the actuator.

5. The method of claim 1, further comprising adjusting the air inlet throttle position in response to barometric pressure.

6. The method of claim 1, further comprising adjusting the air inlet throttle position in response to intake manifold pressure.

7. The method of claim 1, where the intake valve is a cylinder intake valve, and where the engine is decelerating at a time of the request to restart the engine.

8. A method for operating an engine, comprising:
ceasing combustion in a first cylinder in response to a request to automatically stop the engine;
adjusting a position of an air inlet throttle at a time after a closing timing of an intake valve of a second cylinder having an open intake valve at a time of a request to restart the engine and before a closing of an intake valve of the first cylinder, the second cylinder immediately preceding the first cylinder in order of engine combustion; and
reinitiating combustion in the first cylinder after adjusting the position of the air inlet throttle.

9. The method of claim 8, further comprising reinitiating combustion in the second cylinder.

10. The method of claim 9, further comprising adjusting the position of the air inlet throttle at the time after the closing timing of the intake valve of the second cylinder having the open intake valve at the time of the request to restart the engine and before the closing of the intake valve of the first cylinder in response to engine speed.

11. The method of claim 9, where the engine is a direct injection engine.

12. The method of claim 8, further comprising retarding intake timing of the first and second cylinders.

13. The method of claim 8, where the position of the air inlet throttle is further adjusted in response to intake manifold pressure.

14. The method of claim 8, where the position of the air inlet throttle is further adjusted in response to barometric pressure.

15. The method of claim 8, where the engine is restarted without engaging a starter.

16. A system for controlling an engine, comprising:
an engine including an adjustable valve timing mechanism and an air inlet throttle; and
a controller including executable instructions stored in a non-transitory medium to automatically cease combustion in a first cylinder of the engine and adjust valve timing of the first cylinder in response to operating conditions other than an operator engine stop request, the controller including additional instructions to reinitiate combustion in the first cylinder and adjust valve timing of the first cylinder in response to operating conditions, the controller including additional instructions to adjust a position of an air inlet throttle at a time after closing an open intake valve of a second cylinder having an open intake valve at a time of a request to restart the engine and before a closing of an intake valve of the first cylinder in response to a request to restart the engine, the first cylinder immediately following the second cylinder in a combustion order of the engine.

17. The system of claim 16, where the controller includes further instructions to adjust the position of the air inlet throttle at the time after closing the open intake valve of the second cylinder having the open intake valve at the time of the request to restart the engine and before a closing of the intake valve of the first cylinder in response to barometric pressure.

18. The system of claim 16, where the controller includes further instructions to adjust the position of the air inlet throttle at the time after closing the open intake valve of the second cylinder having the open intake valve at the time of the request to restart the engine and before a closing of the intake valve of the first cylinder in response to engine speed.

19. The system of claim 16, where the controller includes further instructions to adjust the position of the air inlet throttle at the time after closing the open intake valve of the second cylinder having the open intake valve at the time of the request to restart the engine and before a closing of the intake valve of the first cylinder in response to intake manifold pressure.

20. The system of claim 16, where the controller includes further instructions to reactivate combustion in the first cylinder after adjusting the position of the air inlet throttle.

* * * * *